April 11, 1939.  L. W. GARDNER  2,153,920
SEISMOGRAPH PROSPECTING
Filed Oct. 17, 1936   3 Sheets-Sheet 1
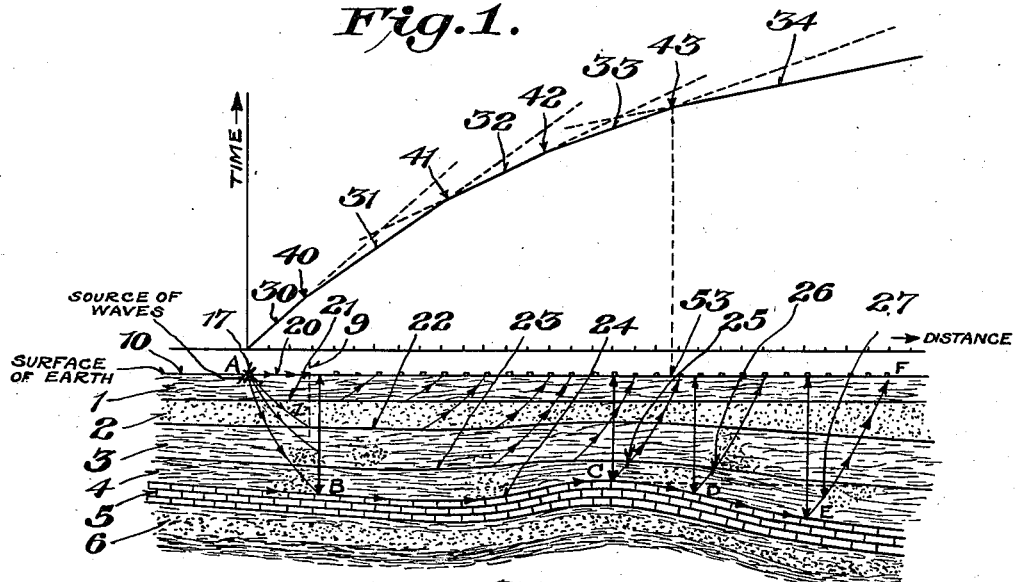
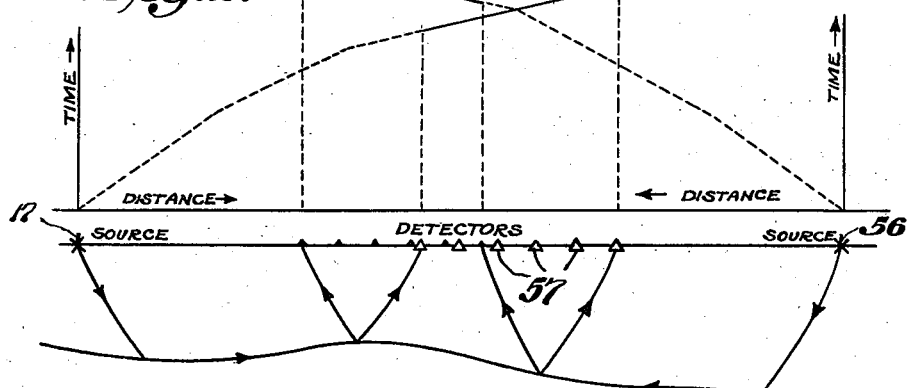
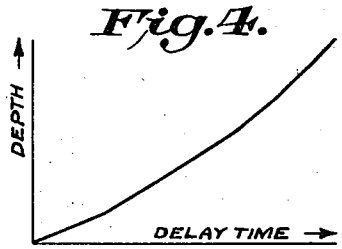
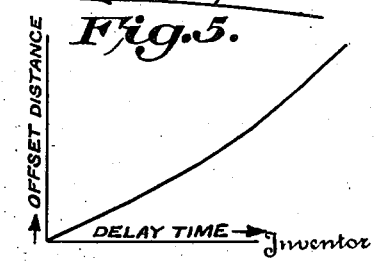
Inventor
L. W. Gardner,
By G. M. Houghton
his Attorney April 11, 1939.  L. W. GARDNER  2,153,920
SEISMOGRAPH PROSPECTING
Filed Oct. 17, 1936  3 Sheets-Sheet 2
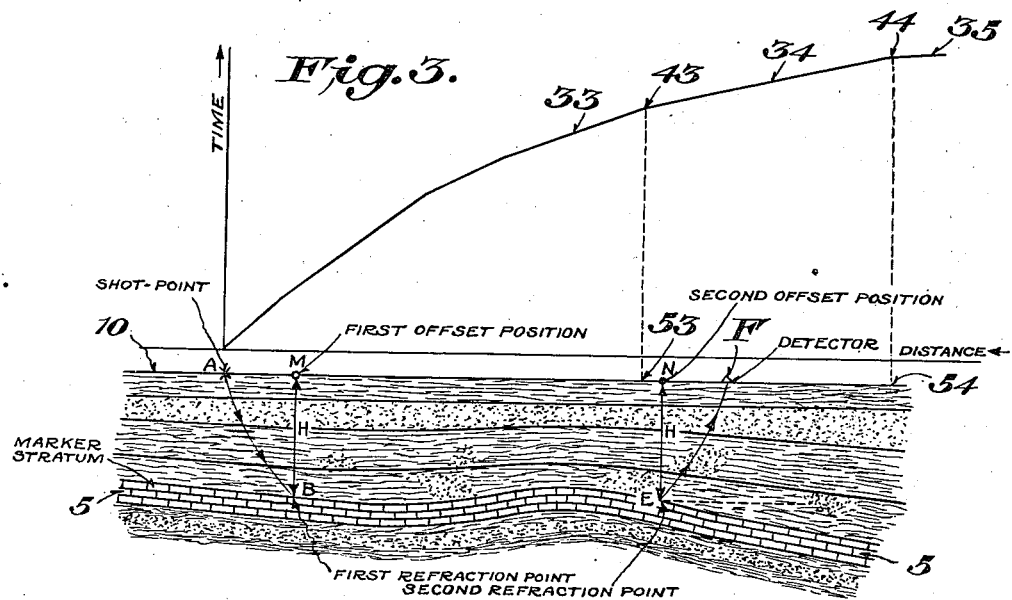
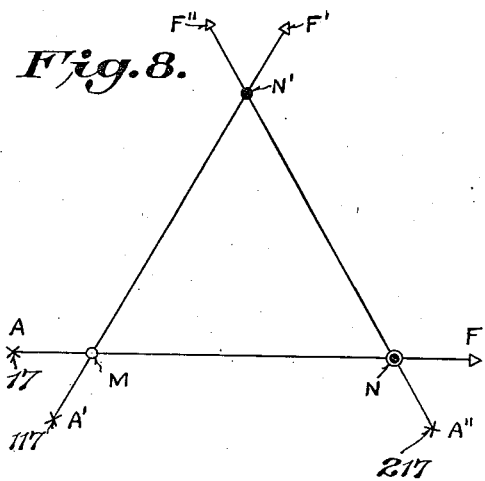
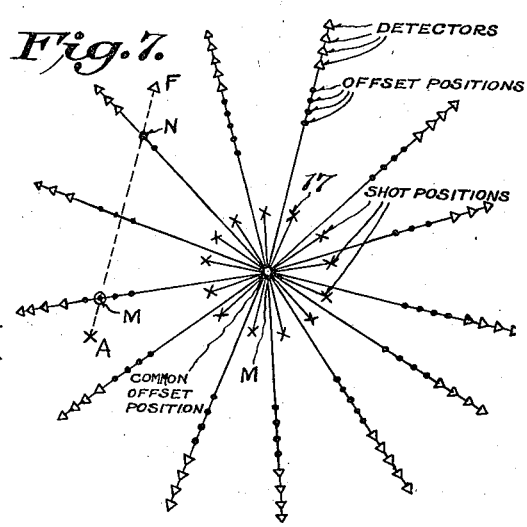
Inventor
L. W. Gardner,
A. M. Houghton
his Attorney April 11, 1939.   L. W. GARDNER   2,153,920
SEISMOGRAPH PROSPECTING
Filed Oct. 17, 1936   3 Sheets-Sheet 3
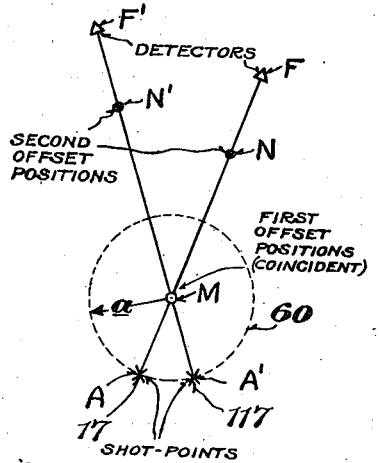
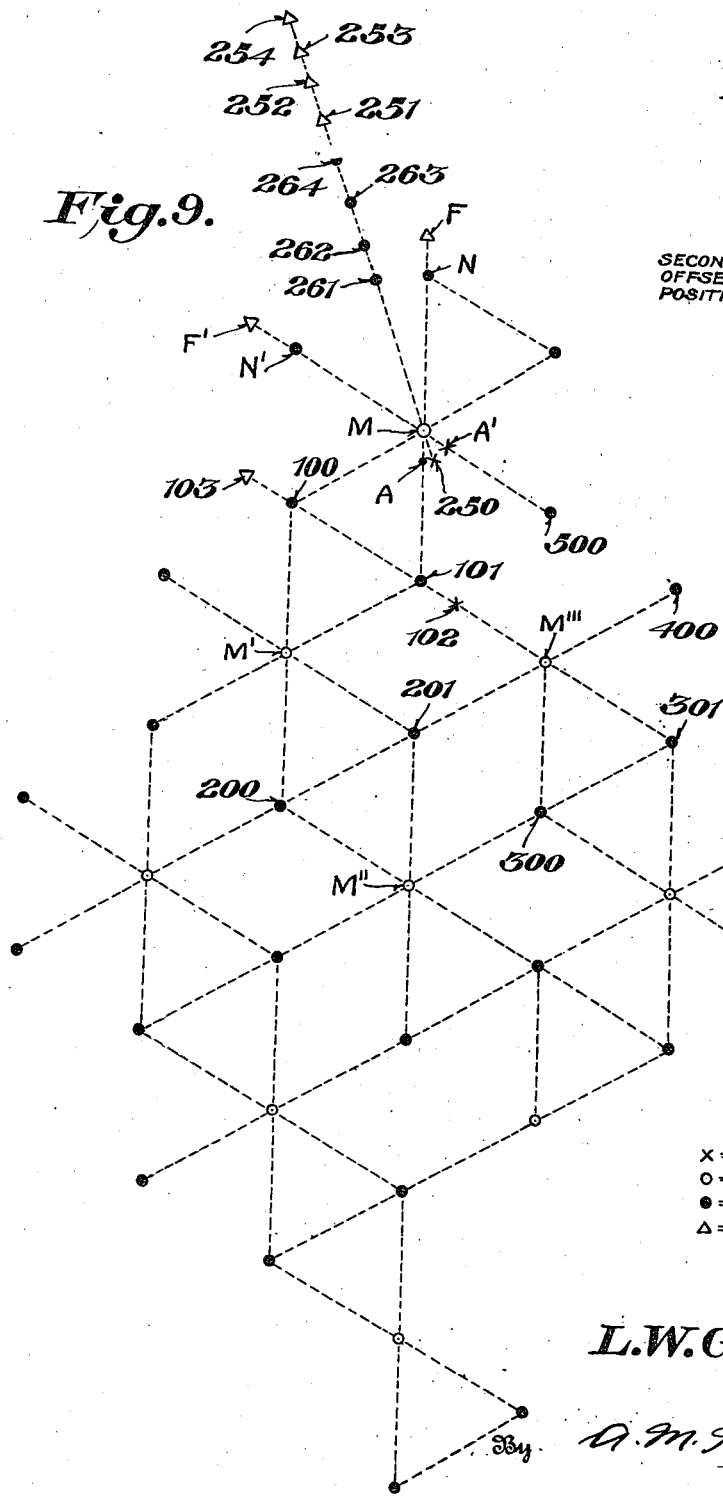
LEGEND
X = SOURCE OF WAVES
O = FIRST OFFSET POSITION
● = SECOND OFFSET POSITION
△ = DETECTOR
Inventor
L. W. Gardner,
By A. M. Houghton
his Attorney Patented Apr. 11, 1939

2,153,920

UNITED STATES PATENT OFFICE 2,153,920

SEISMOGRAPH PROSPECTING

Louis W. Gardner, Pittsburgh, Pa., assignor to Gulf Research & Development Company, Pittsburgh, Pa., a corporation of Delaware Application October 17, 1936, Serial No. 106,262

12 Claims. (Cl. 181—0.5)

This invention relates to seismograph prospecting; and it comprises a method for determining sub-surface geological structure in regions in which there is at least one buried stratum having a characteristic speed higher than that of any overlying stratum, which method comprises setting up a source of seismic waves at or near the surface of the earth so as to cause waves to penetrate downwardly to the high speed stratum, to intercept the stratum at a first refraction point determined by the critical angle at the interface between the high speed stratum and overlying strata, to follow the interface and to be refracted upwards at angles equal to said critical angle, detecting such refracted waves at a position on the earth, said position having associated therewith a second refraction point on the high speed stratum determined by the critical angle, then setting up another source of waves at a location on the surface of the earth different from the first and lying on the circumference of a circle the center of which is substantially directly above the first refraction point and the radius of which is equal to the offset distance between the first source and a point on the surface of the earth directly above the first refraction point, so that waves are again caused to penetrate downwardly, to intercept the high speed stratum at substantially the same first refraction point, to follow the interface and to leave upwardly at the critical angle, and detecting waves at a position spaced from said second source and lying in a vertical plane including it and the said common first refraction point, said position having associated therewith another second refraction point, whereby the differential depth between the two second refraction points can be calculated and inferences drawn as to the contour of the high-speed stratum; and it further comprises extensions of the process to yield absolute depth determination; all as more fully hereinafter set forth and as claimed.

The object sought in refraction seismograph prospecting is to secure information as to the character of buried rock and earth formations, and as to the contour and depths of such formations.

In refraction seismograph prospecting, the standard procedure is to set up seismic waves by means of a source such as a mechanical vibrator or an explosion at a point at or near the surface of the earth, termed hereinafter the shot-point. These waves are of both transverse and compressional types. They travel outward in all directions from the source and undergo reflection and refraction at the interface between any two rock layers having different physical properties. If the geologic section contains one or more rock layers which transmit seismic waves at higher speed than any other overlying layer, there will be waves incident to such layers at "critical angles", angles such that the waves will be refracted along the surfaces of these layers, then again refracted, at angles equal to the critical angles, to the surface of the ground. Typical wave trajectories thus formed are of trapezoidal form. Of all the wave paths by which waves travel from the source to detectors, compressional waves following trajectories of this type will be the first to arrive at the detector positions.

A plurality of detectors are set up, usually in alinement with the source, and detectors are arranged in conjunction with a recorder to produce a multiple-record seismogram. Travel times of waves from source to detectors are obtainable from these records. The travel times of those waves which arrive first at the detectors are used; such times being termed first arrival times. The use of these times constitutes a selection, from all the possible types of waves and trajectories by which wave energy may be transmitted from source to detector, of those waves which are of the compressional type following the trapezoidal type trajectories cited above. Hereinafter, only these type waves and trajectories are considered.

From the observed first arrival times at the various detector positions, a so-called time-distance graph is constructed, in which travel time (ordinates) versus horizontal shot-detector distance (abscissae) shows the time it takes the wave to travel from the source to any position on the surface of the ground in the line of detectors spaced from the source. It is usually a broken line curve, the segments having less slope the greater the shot-point to detector distance. For short shot-point to detector distances waves travelling directly from shot-point to detector will be first arrivals. For longer shot-point to detector distances, waves penetrating to the shallowest stratum or layer of higher characteristic speed than any overlying layer, and following a trapezoidal trajectory, will be first arrivals since part of the path is traversed at higher speed than the direct travelling waves. For still longer shot-point to detector distances, waves will penetrate to deeper levels, follow higher speed layers and will be the first arrivals at detectors. Each segment of the time distance curve is associated with waves which are refracted along a particular refracting layer, and each break in the time distance curve is associated with the transition point at which waves following one refracting layer are overtaken by waves following deeper, higher speed refracting layers.

If the layers are level, the slope of each segment of the time distance curve is the reciprocal of the speed of the refracting layer with which it is associated, so that the speeds of the refracting beds are determinate. The positions of the breaks in the time distance curve are related to the speeds and thicknesses of the refracting beds, so that, if the speeds of the beds are determined from the observations, the thicknesses of the beds may be determined.

If the layers are sloping, the slopes of the segments are modified in a determinate way. In conventional practice, relations between speeds, slopes of beds, thicknesses of beds, observed slopes of segments of the time distance curve, and observed positions of breaks in the time distance curve are known for cases in which the refracting beds are level, have monoclinal slope, or are faulted, as given by Donald C. Barton, Geophysical Prospecting, A. I. M. E. (1929). Thus, conventional practice permits the determination of speeds, slopes, thicknesses, and depths of refracting beds for the cases in which these beds are level, have monoclinal slope or are faulted, at each place where the process of setting up waves and detecting them at spaced points is carried out. By repeating this process over the terrain, as many depth values as desired may be obtained for the refracting beds. These values indicate the undulations of the refracting beds and accordingly, the structural conditions of the area. Also, the determination of speeds permits a partial identification of the particular beds being followed.

In large degree, however, the accuracy of these results is dependent upon the condition that the refracting bed followed is level or has a monoclinal slope. Where the undulations of refracting beds which it is sought to determine are broad in comparison with the shot-point to detector distances being used, this condition is satisfied and the procedure is satisfactory. Where the shot-point to detector distances being used are long in comparison with the breadth of the undulations of the refracting beds this procedure is not satisfactory, since the error introduced by the postulate of monoclinal slope is of the same order as the magnitude of the undulations which it is sought to determine. In practice, it is often sought to determine the undulations, which may be but one to three miles across, of beds which are at depths of the order of 5000 feet deep, and require shot-point to detector distances of three to six miles. In this case, it is difficult to properly make depth determinations to a sufficient degree of accuracy to obtain a correct representation of the undulations of the refracting beds.

To simplify the task, and to secure a larger number of relative depth determinations in a given locality, there has been proposed the so-called "fan shooting" method, which consists in having a common shot position for several unit operations, the detectors being set up along radii from the common shot position. This gives a set of relative depth values in a circle whereby the dip and slope of the buried strata in the region under the detectors can be found approximately. This method gives correct results only when the buried strata are horizontal, and the determinations are in error to an extent increasing with the degree to which the strata slope or dip. In regions in which the buried monoclines, anticlines and synclines are steep, the determinations may have a very considerable error.

One object of the present invention is to provide a simple method of refraction seismograph prospecting adapted to making accurate determinations of sub-surface contours even when these vary considerably in dip or slope within distances less than the required shot-point to detector distance.

Another object is to provide such a method which will yield results from which can be determined the actual difference in depth between two points on an underlying stratum, whereby its slope can be determined.

Another object is to provide a method involving three operations combined in such manner as to give results on the absolute depth of three points on a buried stratum.

Another object is to provide a method for seismographical triangulation in which a plurality of operations are so combined as to give information as to relative or absolute depths of buried strata over any areal extent desired, whence the contour of such strata can be found; such method giving accurate results even for strata which have variation in dip or slope within distances less than the required shot-point to detector distances.

These and other objects are achieved by means of the processes set forth below. The method in all its embodiments comprises the steps of performing two seismograph shot-detecting-recording operations, i. e. refraction lines in such manner that the refraction lines intersect in a particular geometrical relation, this relation being that one of the refraction points (described below) associated with one line shall be common with one of the refraction points associated with the other line. This coordination of the shooting makes possible the determination of dip of underground beds, more particularly that of a predetermined high speed marker bed, between the two refraction points which are not common. A variation of this method is to shoot three refraction lines geometrically so related that the lines form the sides of a triangle, each refraction point of each line being common with one refraction point of another line; whereby depth determinations may be made at the corners of the triangle. Further extensions comprise multiplication and coordination of these steps in a systematic manner in order to determine dips and depths over any desired area. In the shooting of all these refraction lines, the detectors are placed at a spaced position from the shot point. This position is within certain limiting distances from the shot point, usually such that the first wave reaching the detector is a wave which has followed along the marker bed.

Several embodiments of the invention are illustrated diagrammatically in the accompanying drawings, in which Fig. 1 is a diagram of a typical geological structure to which the method can be applied, together with an illustrative shot-point and detector layout and corresponding time-distance curve, Fig. 2 is a diagrammatic representation of two opposed refraction set-ups, for the purpose of determining the speed of any marker bed, Fig. 3 is a diagram analogous to Fig. 1 to illustrate specific features characteristic of the invention, to be described, Fig. 4 is a typical graph of delay time versus depth, associated with conditions represented by Figs. 1 and 3;

Fig. 5 is a typical graph of delay time versus offset distance associated with conditions represented by Figs. 1 and 3;

Fig. 6 is a diagram of one embodiment of the invention employing two refraction operations;

Fig. 7 is a diagram of another embodiment employing a plurality of angularly arranged refraction operations;

Fig. 8 is a diagram of another embodiment, employing three refraction operations triangularly arranged, and Fig. 9 is a diagram of triangulation method according to the invention.

Prior to performing the processes of the invention proper, it is necessary to secure some information as to the depth and characteristic speed (at one point in the terrain under consideration) of one or more buried strata which may be termed a marker stratum or strata. Operating under the invention I can then trace out the configuration of the marker stratum over the terrain. The preliminary information can be secured by vertical shooting in wells, if such are available, but wells are usually not available and in most cases it is most expedient to secure the information by seismic methods to be described.

More specifically, the invention depends on the presence, in the terrain under consideration, of at least one buried high speed layer, having a characteristic wave-transmitting speed higher than that of any of the overlying strata. Many regions of geological interest contain at least one such bed. Included in these are regions of economic interest because of the possible presence of oil; to which regions geophysical investigation by means of the present process is particularly suitable. For example a typical geologic section in geosynclines where oil may be present is (beginning at the surface of the earth) weathered shales, sandstone, limestone; the limestone having the highest characteristic speed. The present process is adapted to determine the configuration of the top surface of this high speed layer. It is an established fact that determination of the configuration of such a surface is usually indicative of the configuration of the strata some distance above and below the interface.

The high speed layer I term the marker bed. If there be more than one marker bed, the lower beds being of progressively higher speed than the upper, I sometimes make use of several of them, to obtain as accurate a picture as possible of the stratification. This arrangement of beds is rather common. For example, there may be several limestone strata, deeper ones having higher characteristic speeds.

Certain basic principles of conventional refraction seismograph prospecting are embodied in this invention. These are: that seismic waves are set up at a source such as vibrator or an explosion; that the waves are detected at detectors located at spaced positions on the surface of the ground and recorded on a multiple-record seismogram; and that first arrivals are used representing travel times of compressional waves which have followed trapezoidal wave paths. However, I sometimes use arrivals later than the first which can be identified as being arrivals of waves following the trapezoidal type trajectories by correlation. These are treated in exactly the same manner as first arrivals.

There is first performed a preliminary shooting near the center of any given area to be prospected for the purpose of determining: (1) the presence of a suitable marker bed to investigate, (2) the vertical distribution of speeds through the geologic section down to the chosen marker bed, (3) the speed of the marker bed, and (4) the approximate shot-detector distances which will cause waves which have followed the marker bed to be first arrivals.

This preliminary shooting ordinarily comprises shooting toward a series of detectors at spaced distances from, and in alinement with, a shot-point.

Fig. 1 shows this procedure, and also illustrates the behavior of seismic waves in the earth, which will be useful in considering my method proper (described later). Referring to Fig. 1, below the surface 10 of the ground is a shale layer 1, a sandstone layer 2, two shale layers 3 and 4, a high speed limestone layer 5, having an undulating configuration as shown, and an underlying medium speed sandstone layer 6. This arrangement is representative of conditions often encountered in the field. A source of seismic waves e. g. a charge of dynamite 17 is set up at any position A on the surface of the earth; or, more usually, buried some distance below the surface. Waves are propagated in all directions and at all angles from the source. Reflection and refraction occur at each stratum interface. Considering the rays from the source, that is to say lines representing direction of travel of the wave, one ray 20 travels along the surface of the earth, without penetrating. Shallow rays strike an interface at a large angle to the normal and are reflected up toward the surface of the earth at an angle equal to the angle of incidence. Steep rays, i. e. those near the vertical, penetrate the interface and by far the greater part of the wave energy does not return to the surface of the earth. But rays in one direction, namely in a direction downward toward the interface at the critical angle for the interface in question (e. g. at the critical angle Z between the ray 22 entering the interface 2—3 and the normal to the interface, line 9) are so inflected as to course along the interface, in the upper part of the underlying stratum. It is these rays which are useful in the present invention. As shown, there is one such ray, denoted by 21, which courses along the interface between strata 1 and 2; another ray, 22, coursing along the interface between strata 2 and 3, and two more, 23 and 24, coursing along the interface between strata 3 and 4, and 4 and 5. It is the last named ray, 24, which is used in this instance. It intercepts stratum 5 at a point B which I term the first refraction point (Figs. 1 and 3).

As the wave corresponding to ray 24 travels along, waves are sent up toward the surface from along the interface. Three rays, 25, 26 and 27, are indicated (out of an infinite number) representative of such waves. The rays leave the interface at second refraction points C, D and E; making the same angle to the normal to the interface as does the entering ray; which angle is the critical angle.

Units of distance along the surface of the earth are indicated by square dots. A plurality of detectors (not shown) are set up at spaced intervals from the source 17 e. g. at intervals marked by the square dots. These are connected to a recorder (not shown) and records are secured in a known manner of the first arrival times of waves reaching the detectors. From the records there is constructed in a known way a time distance curve or traveling time curve, sketched to scale in the upper portion of Fig. 1. The curve is composed of segments, each segment corresponding to passage of waves through one of the several strata. In the diagram, segments 30, 31, 32, 33, 34 correspond to travel of waves along the surface of the ground and along interfaces between strata 1 and 2, 2 and 3, 3 and 4, and 4 and 5, respectively.

First arrival times are made use of as a basis for measurement. Since longitudinal waves (compression waves) always travel at considerably higher speeds than do transverse waves, the employment of minimum travel times automatically selects the longitudinal waves for measurement.

The points at which the segments meet, namely points 40, 41, 42 and 43, correspond to points on the surface of the earth which are reached by waves from two interfaces simultaneously. Very close to the source, waves reach the detectors quicker through the uppermost stratum, the shortness of the path being the predominating factor. At a great distance from the source the waves reach the detectors quicker through the lower, higher speed stratum, the higher speed wave-transmitting characteristics of the deep stratum predominating here. At a certain intermediate position, the waves reach the surface of the earth at the same time. For example, point 43 corresponds to a point 53 on the surface of the earth which is reached simultaneously by waves passing through strata 4 and 5. Slightly to the left of point 53 a point on the surface of the earth is reached first by waves through 4; a point to the right of 53 is reached first by waves through 5. Point 53 may be called an equal travel time point.

Segment 34 is of primary interest.

The interval distance between detector positions may be 500 feet, and the line of detectors extends from the shot-point to a distance as great as practical conditions permit satisfactory observations (3 to 6 miles). Practical execution of this shooting with a limited number of detectors ordinarily involves shooting a succession of shots at the same shot-point as the several detectors are shifted in position to occupy the positions indicated. Then, this operation is repeated in placing the shot at the opposite end of the line of detectors.

This shooting serves to define the segments of the time distance curve, from which the speeds, thicknesses, and depths of the beds followed by the trapezoidal type trajectories may be approximately determined by conventional methods in ordinarily considering the refracting beds to be level. Thus, the vertical distribution of speeds in the section is determined. This determination involves the condition ordinarily imposed in conventional refraction seismograph prospecting that each observed segment of the time distance curve is associated with a refracting bed which has isotropic and uniform speed characteristics vertically throughout its thickness, and that all such beds present in the section yield observed segments on the time distance graph. This condition is seldom satisfied, and consequently there will be error in the determination of the vertical distribution of speeds. Such error has but slight influence on the determination of the undulations of the marker bed according to the invention, but does influence the depth determinations. As stated, if available, vertical speed distribution determinations from well data are used.

A suitable marker bed is chosen to be mapped. It is ordinarily one of the refracting beds indicated by the segments of the time distance curves which satisfies the following requirements: that it lies at a depth of 3000 feet to 10,000 feet; that its speed is appreciably higher (15 per cent or more) than that of any shallower refracting bed; that the length of the segment of the time distance curve associated with it is fairly long (2500 feet or more); and that good first arrivals are observed along this segment under practicable conditions of observation. Marker beds satisfying these conditions have been found throughout broad areas in Venezuela, Mississippi, Colorado and Mexico.

A particular segment of the time distance curve is definitely associated with the chosen marker bed, so the shot-point to detector distances required such that waves which have followed the marker bed are observed are also known. These distances ordinarily vary slowly over the area, but are now known sufficiently well to plan further shooting.

In determination of speed of the various refracting beds from the segments of the time distance curves obtained by this preliminary shooting, the reciprocal of the slope of each segment may be designated the apparent speed of the refracting bed with which it is associated. This apparent speed will be the true speed if the refracting bed and overlying beds are level, but will deviate from the true speed if these beds are sloping. If shots in opposite directions are made on beds having a given slope, an average of the apparent speeds associated with any given bed will nearly cancel the effect of slope and yield the true speed. Over the length of the line of detectors used in this preliminary shooting the slopes of the beds may change somewhat, so that the averages of the apparent speeds of segments associated with particular refracting beds for shots in opposite directions will not completely cancel the effect of slopes, and only approximate values of the speeds of the refracting beds are obtained. These values, however, are ordinarily sufficiently accurate for the beds overlying the marker bed, but not sufficiently accurate for the speed of the marker bed itself. The determinations of speeds of beds overlying the marker bed influence only the vertical distribution of speeds within the geologic section, whereas the speed of the marker bed influences the determinations of the undulations of the marker bed unless a uniform shot point to detector distance is used everywhere over the area being prospected.

In order to more accurately determine the speed of the marker bed, I perform a supplementary preliminary shooting in the same locality as the preliminary shooting. This consists of two opposing shot detector set-ups as shown in Fig. 2. Detectors are located at spaced distances as at 57 from one shot point 17, the distances being approximately equal to the distances at which the marker bed segment of the time distance curve was observed in the preliminary shooting. In the other set-up, detectors are similarly set up with respect to a second shot-point 56. These two set-ups are so located with respect to each other that the waves originating at shot-point 17 will emerge from approximately the same zone along the marker bed as will those originating at shot-point 56. These set-ups will then yield respectively the segments 34 and 134, of the time distance curves. The slopes of the beds under the detectors have been made the same for the two set-ups and the average of the reciprocals of the slopes of the segments, or average of apparent speeds will be the true speed of the marker bed.

The relative positions at which the opposing sets-ups are placed is apparent from the figure if the trajectories of the waves are known. These are readily determinate approximately from laws of refraction used with the depth and speed data obtained from the preliminary shooting.

These procedures give the following information: (1) the presence of a suitable marker bed; (2) the vertical distribution of speeds of beds overlying the marker bed; (3) the speed of the marker bed; and (4) the approximate shot-detector distances which will cause waves which have followed the marker bed to be first arrivals. It has been found by experience that items (1), (2) and (3) above ordinarily may be regarded as uniform in a region surrounding the locality of the preliminary shooting, and that the depth of the marker bed is variable, item (4) varying slowly in accordance therewith. The invention will be described on this basis, although it is useful where items (1), (2) and (3) are variable, in which case a number of set-ups equivalent to the preliminary shooting may be required to define the conditions at different localities and calculations must be modified accordingly.

The procedures thus far described are old per se.

I

I now proceed with the invention proper. In one of its aspects, it may be regarded as a combination of unit operations of the type illustrated in Fig. 1, so interrelated as to give the required results. A source of seismic waves is set up, and a detector is positioned in the ground at a spaced distance therefrom, the distance being such that the first arrival at the detector is a wave which has followed along the top of bed 5, considered here as the marker bed. The operation previously described serves to determine the limiting positions, i. e. distances from the source, between which the detector can be placed in order to record an arrival time of a wave which has followed the marker bed. Referring to Fig. 3, which reproduces a portion of Fig. 1, segment 34 corresponds to stratum 5 (the marker bed) while segments 33 and 35 correspond to overlying stratum 4 and underlying stratum 6 respectively. The detector can be placed anywhere between points 53 and 54; for example at point F.

Referring to Fig. 3, waves from the source reach the detector F along the path shown. The arrival times are detected and recorded in a known manner. In practice, it is usually necessary to correct the observed arrival time for surface conditions of the ground, weathering, shot-hole depth and surface elevations. This can be done by known methods. Shot-detector distances are measured by ordinary surveying methods. Thus, the corrected arrival time and the shot-detector distance are known.

I now introduce the concept of an hypothetical wave trajectory approximating the actual trajectory ABEF, Fig. 3. This hypothetical trajectory will be that trajectory which the waves would follow if all beds were level in the localities of the wave paths AB and EF. The ordinary law of refraction is considered to hold for both the actual trajectory and for the hypothetical trajectory. In accord therewith, the segments AB or EF would have angular tilts for the actual trajectory somewhat different from that for the hypothetical trajectory. This difference is zero if the beds are actually level in the localities of the wave paths AB and EF and is increasingly large for increasingly large dips of the beds in the localities of the wave-paths AB and EF. It has been found that if dips of beds do not exceed about 10 per cent in these localities, very small error is introduced into calculations in using the hypothetical approximation trajectory as the basis of calculations rather than the actual trajectory. Where dips of beds exceed 10 per cent modifications of calculations may be made; such modifications do not affect the principles of the invention.

This hypothetical trajectory is used throughout the description of the invention following. In Fig. 3, consider ABEF to be such a trajectory. The transit or arrival time T for a wave coming from the source to detector F is the sum of the times it takes the wave to travel the segments AB, BE, and EF; or, in mathematical language, $$T = t_{AB} + t_{BE} + t_{EF} \qquad (1)$$

Let $v_r$ = speed of the marker bed 5 and

X = AF = shot-point to detector distance.

In Fig. 3, M and N are two points directly (vertically) above the first and second refraction points B and E respectively, and are termed first and second offset positions.

BE = MN to a sufficiently close approximation. then, $BE = MN = AF - AM - NF$ and $$t_{BE} = \frac{BE}{v_r} = \frac{X}{v_r} - AM/v_r - NF/v_r$$

Equation 1 can now be written:

$$T = (t_{AB} - AM/v_r) + (t_{EF} - NF/v_r) + X/v_r \qquad (2)$$

I define $t'_M = t_{AB} - AM/v_r$. I call the quantity $t'_M$ the delay time associated with points A and M.

Likewise $$t'_M = t_{EF} - NF/v_r \qquad (3)$$

I call the quantity $t'_N$ the delay time associated with points N and F.

I define $b = T - X/v_r$ and call $b$ the intercept time.

The intercept time $b$ is given in terms of the arrival time T, the shot point to detector distance X, and the speed ($v_r$) of the marker bed; which three latter quantities are all known for a single shot, as described. Thus I can determine directly $b = T - X/v_r$. This may be regarded as an observed quantity.

Equation 2 may be expressed in terms of the defined delay times and intercept time:

$$t'_M + t'_N = b \qquad (4)$$

Then for a single shot, the sum of the delay times associated with points M and N is known. If the marker bed 5 were at the surface of the ground, the delay times $t'_M$ and $t'_N$ would be zero. With the marker bed buried as shown, the times $t'_M$ and $t'_N$ represent the time required for the wave to follow the trapezoidal trajectory down to the refraction point B and up from the refraction point E, in excess of the time that would be required if the marker bed were at the surface of the ground. It is this consideration which suggests the term "delay time". The greater the depth $H_B$, the greater will be the delay time $t'_M$; and inversely, the greater $t'_M$ is found to be, the greater must be depth $H_B$. The same considerations apply to $H_E$ and $t'_N$. For any given speeds and thicknesses of beds 1 to 4 which overlie marker bed 5, of which the thickness of one bed is unknown it is possible to determine mathematically the relationship between times $t'$ and depths $H$. This relationship is conveniently represented graphically, as in Fig. 4. Then if the delay time $t'$ at any place be determined, the depth of the marker bed at that point can be read from the graph. The operation so far described, however, does not give the value of the delay time at any point; it only gives the sum of the delay times $t'_M + t'_N$ at two spaced points.

The location of the shot point A and the detector position F are definite and are measured directly by ordinary surveying methods, but the positions M and N, the first and second offset positions are offset from A and F by distances which have not yet been determined. These are established as follows:

Let $a_M = AM$ and $a_N = FN$ represent the offset distances. The quantities $a_M$ and $a_N$ are likewise greater the greater the corresponding delay times $t'$. A definite relationship between offset distances $a$ and delay times $t'$ can be determined mathematically for any given speeds and thicknesses of beds 1 to 4 which overlie marker bed 5, of which the thickness of one bed is known. A typical graphical relationship, corresponding to Figs. 1 and 3, is shown in Fig. 5. Thus if delay times can be determined, the corresponding depths and offset positions can be determined from Figs. 4 and 5 respectively.

The relationships between depths and delay times and between offset distances and delay times as represented by the graphs shown in Figs. 4 and 5 may be derived as follows:

Consider all beds overlying the marker bed to be level over the area being prospected, and the top surface of the marker bed to be undulatory with dips which, however, are relatively small (up to say 10 per cent). Further consider the speeds of all beds down to and including the marker bed to be uniform laterally over the area. These conditions ordinarily approximate those actually existing sufficiently closely so that good results from the use of the invention may be obtained, although modifications of these conditions may yield better results in some cases. Such modifications, however, do not alter the operating principles of the invention, but affect only details of calculation.

Let $h_1$ designate the thickness of the uppermost bed 1 having speed $v_1$, let $h_2$ the thickness of the next refracting bed 2 having speed $v_2$, and let $h_3$—$h_n$ the thicknesses of successive beds 3, 4—$n$ having respectively speeds $v_3$, $v_4$—$v_n$. The index number $n$ designates always that bed immediately overlying the marker bed, and the particular bed it designates will depend upon the position of the surface of the marker bed in the geologic section. In Fig. 1, $n$ equals 4, referring to bed 4.

As described previously, the preliminary shooting (or vertical well shooting) in an area yields the thicknesses and speeds of the beds overlying the marker bed, and the speed of the marker bed at a given locality. According to the conditions imposed here, all of these quantities remain uniform laterally over the area except the index number $n$, and the thickness of bed $n$, $h_n$. Thus, $h_1$, $h_2$—$h_{n-1}$ and $v_1$, $v_2$—$v_n$, and $v_r$ are known everywhere, $h_n$ and $n$ being variable and unknown over the area with variation in total depth $H$ of the surface of the marker bed.

The wave path AB, Fig. 3, taken as being part of the hypothetical approximation trajectory described previously, is typical. Let $Q_{ir}$ designate the angle between the wave path within any bed $i$ and the vertical. Then, by the law of refraction:

$$\left.\begin{array}{l} \sin Q_{nr} = \dfrac{v_n}{v_r}; \\[4pt] \dfrac{\sin Q_{n-1,r}}{\sin Q} = \dfrac{v_{n-1}}{v_n}; \sin Q_{n-1,r} = \dfrac{v_{n-1}}{v_r} \\[4pt] \dfrac{\sin Q_{n-2,r}}{\sin Q_{n-1,r}} = \dfrac{v_{n-2}}{v_{n-1}}; \sin Q_{n-2,r} = \dfrac{v_{n-2}}{v_r} \text{ etc.} \\[4pt] \sin Q_{1r} = \dfrac{v_1}{v_r}; \sin Q_2 r = \dfrac{v_2}{v_r}; \sin Q_{1r} = \dfrac{v_1}{v_r} \end{array}\right\} \quad (5)$$

Delay time $$t' = t_{AB} - \frac{AM}{v_r} \text{ by definition}$$

but $$t_{AB} = \sum_{i=1}^{n} \frac{h_i}{v_i \cos Q_{ir}}$$

and $$AM = \sum_{i=1}^{n} h_i \tan Q_{ir}$$

therefore;

$$t' = \sum_{i=1}^{n} h_i \left[ \frac{1}{V_i \cos Q_{ir}} - \frac{\tan Q_{ir}}{v_r} \right] \quad (6)$$

substituting (5), $$\frac{1}{v_r} = \frac{\sin Q_{ir}}{v_i}$$

$$t' = \sum_{i=1}^{n} \frac{h_i \cos Q_{ir}}{v_i} \quad (7)$$

or $$t' = \sum_{i=1}^{n-1} \frac{h_i \cos Q_{ir}}{v_i} + \frac{h_n \cos Q_{nr}}{v_n} \quad (7')$$

The sum of thicknesses of all beds overlying the marker bed is the depth of the surface of the marker bed $$H = \sum_{i=1}^{n} h_i \quad (8)$$

or $$H = \sum_{i=1}^{n-1} h_i + h_n \quad (8')$$

From (7) and (8'):

$$H = \left[ t' - \sum_{i=1}^{n-1} \frac{h_i \cos Q_{ir}}{v_i} \right] \frac{v_n}{\cos Q_{ir}} + \sum_{i=1}^{n-1} h_i \quad (9)$$

By geometry, the offset distance $a = AM$ is given by:

$$a = AM = \sum_{i=1}^{n} h_i \tan Q_{ir} \quad (10)$$

or $$a = \sum_{i=1}^{n-1} h_i \tan Q_{ir} + h_n \tan Q_{nr} \quad (10')$$

with (8'), this becomes:

$$a = \sum_{i=1}^{n-1} h_i \tan Q_{ir} + \left[ H - \sum_{i=1}^{n-1} h_i \right] \tan Q_{nr} \quad (10'')$$

substituting (9)

$$a = \left[ t' - \sum_{i=1}^{n-1} \frac{h_i \cos Q_{ir}}{v_i} \right] \frac{v_n \tan Q_{nr}}{\cos Q_{nr}} + \sum_{i=1}^{n-1} h_i \tan Q_{ir} \quad (11)$$

Equations (9) and (11) are the relations sought between depth and delay time, and between offset distance and delay time, and which are represented in graphical form in Figs. 4 and 5.

Equation (9) represents a linear relation between H and $t'$ for any particular value of $n$. Equation (11) represents a linear relation between $a$ and $t'$ for any particular value of $n$. As stated above, the index number $n$ has different integral values associated with the index number of the bed immediately overlying the marker bed, and the equations are valid in properly thus associating these index numbers. The graphs Figs. 4 and 5 are constructed from Equations (9) and (11) in assigning to the index number $n$ values 1, 2, 3 etc. down to the bed found overlying the marker bed.

As stated, the operation described yields a value for the sum of delay times $t'_M + t'_N = b$, from which the average delay time, $$t'(\text{average}) = (t'_M + t'_N)/2$$

can be found. This average value will be sufficiently nearly equal to the values of the delay time $t'_M$ and $t'_N$ to be used for the purpose of determining the offset distances $a_M$ and $a_N$, since ordinarily these distances do not need to be accurately determined.

According to the invention I can now find a differential delay time from which I can determine the differential depth between two spaced points on the marker stratum. The operations required are diagrammed in Fig. 6. In Fig. 6, as in all other figures showing refraction operations, sources are represented by crosses, first offset positions by open circles, second refraction points by black circles, and detectors by triangles.

I first perform an operation as described in connection with Fig. 3. This is done in the neighborhood of the preliminary shooting so that the limiting range of distances at which the detector must be placed from the shot, in order to record arrivals of waves which have followed the marker bed, is known. I then determine the offset distance $a_M$ (equals distance between source at A and first offset position point M). Referring to Fig. 6, a new source, 117, is now set up at a new position A' different from A and lying somewhere on the circumference of a circle 60 the center of which coincides with M and the radius of which equals the offset distance $a_M$. A detector is set up at F', in a line passing through A' and M, and a seismograph record is made.

Proceeding as described previously, I can determine the sum of delay times $t'_M$ and $t'_N$ $$t'_M + t'_N = b_1$$

and $$t'_M + t'_{N'} = b_2$$

($b_1$ and $b_2$ being the intercepts determined from the recordings AF and A'F' respectively)

then $$t'_{N'} - t'_N = b_2 - b_1$$

Thus, $t'_{N'} - t'_N$ can be found and the differential depth corresponding to this differential delay time can be read directly from the depth-delay-time graph (Fig. 4).

The difference in delay times at the free ends of the refraction lines equals the difference in the determined values $b_2 - b_1$. Values of the delay times are given approximately by the average of the delay times at the two ends for given refraction lines, these values being sufficiently accurate to determine with the degree of accuracy required in practice the offset distances, and to determine what part of the delay-time-depth graph to read in determining differences in depth to be associated with determined distances in delay times. Thus the differences in depth are determined for refraction points associated with the free ends of the pair of refraction lines.

In many oil country formations useful shot-detector distance range from 2 to 8 miles and the offset distances work out to range from 2000 to 8000 feet.

II

The method described can readily be extended to cover a larger area by shooting a plurality of refraction lines angularly disposed, while keeping the first refraction point common. This is illustrated in Fig. 7. A plurality of refraction lines are shot, as shown, keeping the first offset position M (or refraction point B) common and moving the source 17 to different positions in a circle thereabout, as described in connection with Fig. 6. In this arrangement there is an annulus defined by rotating points 53 and 54 about point M in Fig. 3, in which the detectors can be placed. The method described yields differential depth between any number of refraction points in a corresponding smaller annulus.

In Fig. 7 there are shown a plurality of detectors for each refraction line. One detector on each line, positioned within the limits of the annulus, is sufficient for the determination of differential depths, but a plurality can be employed as shown to yield a plurality of differential depth determinations from a single shot. Fig. 7 shows the detectors (triangles) and the corresponding offset position points (small circles). According to the arrangement, differential depths will be obtained between all the refraction points corresponding to the offset positions associated with detector positions, represented by the small circles.

By carrying out a number of such ring operations over an area the undulations of the surface of the marker bed can be determined under each of the rings, but the depths of these surfaces are not determined. A pair of rings may be made to overlap in such a way that there will be an offset position (and a refraction point) of one ring common with an offset position (and a refraction point) of the overlapping ring. This gives a common point of the two determined surfaces. The depths being subject to adjustment, may be adjusted to satisfy this tie. The undulations of the surface can then be correctly correlated from one ring to the second. All the rings can be tied together in this way so that undulations of surface of the marker bed are completely determined. The depth of this surface will not be determined except approximately through the average delay time relation.

If desired, any two of the radial refraction lines of Fig. 7 can be tied together by a chordal refraction line, indicated at AF, having offset positions M and N (and refraction points B and E) common with two of the corresponding points of the radial refraction lines. Then the depth of this surface can be secured as described in connection with Fig. 8 as described subsequently.

As shooting of this kind progresses over the area being prospected away from the location of the preliminary shooting, the average depth of the marker bed will vary and correspondingly the observed intercept times, delay times, offset distances, and the range of distances, at which detectors must be placed from the shot point in order to record as first arrivals waves which have followed the marker bed, will also vary. According to the description of the operations above, the suitable range of shot-point to detector distances and the offset distances applicable to any particular operation must be known before that operation is executed. These cannot be accurately known before the shooting is done. However, since the shooting is done progressively over the area, it is possible to infer, by extrapolation of determinations from shooting done, sufficiently accurate values for suitable shot-point to detector distances and offset distances to satisfactorily plan operations to be executed. Further check on whether or not proper shot point to detector distances and correspondingly properly identified arrival times of waves are being used is afforded in using a plurality of detectors in line, and alined with the shot point. If the corresponding observed arrival times yield an apparent speed approximately equal to the speed of the marker bed, assurance is afforded that the waves have followed the marker bed. Moreover, it is very often possible to identify such wave arrivals by correlation of amplitudes of observed events on a record on which the identification is unknown with those on a record on which the identification is known. Ordinarily, the conditions of shooting to be satisfied are so slowly variable and have such large tolerances that little difficulty is experienced in planning shooting to be done in advance, on the basis of shooting already done.

III

While determinations of differential depths as described in section I are often valuable, I usually extend the process so as to secure depth determinations at three points rather than relative depth determinations at two points. This is done by performing a third refraction operation in conjunction with the two described in connection with Fig. 6, so as to make a closed triangle. The procedure is as follows:

Referring to Fig. 8, two refraction lines A—F and A'F' are shot as in Fig. 6. Then a third source, 211, is set up at position A'', located with respect to offset position N (or the refraction point below it) in a manner exactly analogous to the location of A' with respect to M, with the further qualification that A'' and N are alined with offset position N' (or the refraction point below it). A third detector, F'' is set up at the appropriate offset distance $a_{N'}$ and alined with N and A''. Each pair of shot-point to detector setups now has a common refraction point.

There can now be secured three sums of delay times, viz.

$$t'_M + t'_N = b_1$$
$$t'_N + t'_{N'} = b_2$$

and $$t'_{N'} + t'_M = b_3$$

There are but three unknown delay times and three determinate b values, so that solution of these three simultaneous equations yields unique determinations of the three delay times. The solution is as follows:

$$t'_M = (b_1 + b_3 - b_2)/2$$
$$t'_N = (b_1 + b_1 - b_3)/2$$

and $$t'_{N'} = (b_2 + b_3 - b_1)/2$$

From these three delay times there can be read from the depth-delay-time graph (Fig. 4) the depths of the three refraction points corresponding to offset positions M, N and N'.

IV

The method within the scope of the invention that gives most information represents a combination of the ring and triangle operations described. The invention is well adapted for performing a kind of seismographical three-dimensional triangulation. This embodiment is shown in Fig. 9. As apparent from Fig. 9, the process involves carrying out a number of angular set-ups as described in detail in connection with Fig. 6, each angular pair of refraction lines having at least one point common with another.

Referring to Fig. 9, a pair of refraction lines AF and A'F' are shot (upper portion of Fig. 9) as described in connection with Fig. 6, the angle between the lines being about 60° and first offset position M (with refraction point B) being common to the two lines. Additional lines are shot, as shown, so that the total number of lines is six. This yields six second refraction points (under N, N', etc.) at which the differential or relative depth can be computed as described in connection with Fig. 6.

Another set of six lines is shot, having a common first offset position M', and two second offset positions (100 and 101) common with two of the second offset positions of the first set of six lines.

The two sets of six lines are now tied together, by making a chordal refraction line of which point 100 is the first (or second) offset position and point 101 is the second (or first) offset position. This is done by setting the source at position 103 (or 102) and the detector at position 102 (or 103), the offset distances of points 102 and 103 from points 101 and 100 being determined as described previously. It is now possible to compute the depths at points M, M', 100 and 101 and thus tie the two sets of six lines together.

Other sets of six refraction lines can be shot and tied in to the first, in a similar way. For example, six lines can be shot with a common first offset position M'' and two second offset positions 200 and 201 common with two second offset positions of the set of six lines around M'. A chordal refraction line between 200 and 201 can then be shot to tie the new set of six lines together.

Theoretically, one chordal refraction line closing two triangles would suffice to make possible depth determinations over the whole area covered by the various sets of six lines. Actually, it is desirable to shoot chordal refraction lines at various places over the area, to serve as checks and to control cumulative error.

Each chordal refraction line forms a side of a hexagon. It is of course possible to complete each hexagon; for example to make five more chordal lines about M. But this is usually superfluous.

If a complete honeycomb of hexagons be formed, some points, e. g. 101 and 201 will be shot several times. This is unnecessary, and I sometimes omit some of the radii of inner hexagons. For example, radius M''' to 101 may be omitted.

As in the other examples, shot and detector positions can be interchanged at will.

In the specific embodiment illustrated in Fig. 9, only a single detector need be used for each refraction line. If desired, a plurality of detectors may be spaced in a line of any orientation about the common refraction point (M). These yield additional depth determinations, which are particularly well suited for indicating local dip of the marker bed, and which may be particularly efficiently obtained. They are useful in making weathering corrections, they aid in the identification of arrivals of wave events on the records through correlation of arrival event for the several detectors; and they serve as check control on the identification of arrivals as being those which have followed the chosen marker bed.

One such multi-detector refraction line is shown at the extreme upper portion of Fig. 9. A plurality of detectors 251, 252, 253, and 254 are aligned with common first offset position M and with a source 250 offset from point M according to the principle laid down in connection with Fig. 6. There will be a plurality of offset positions 261, 262, 263 and 264 corresponding to the detector positions and offset therefrom as described. In the diagram, for the sake of clarity, the spacing of detectors and magnitude of offset of points are shown to exaggerated scale. Actually, the span of the plurality of detectors might be ⅕ of the distance MN, and 264 would be offset from 254 by approximately the same offset distance as that between M and 250. The manner of obtaining relative depth determinations at the several offset positions is similar to the procedure described in connection with Fig. 6.

If more closely spaced depth determinations are desired than are afforded by the triangulation system shown in Fig. 9, such determinations may be obtained by shooting any number of additional setups in filling in the hexagons to form rings as in Fig. 7, whereby depth determinations are afforded for all refraction points on the rings as described previously.

In the process described the spacings of the shot and the detector are fixed within certain limits (Fig. 3). But the limits are ordinarily sufficiently broad that the hexagons need not be regular but can be warped somewhat to obviate difficulties occurring in the field which may preclude laying out exactly regular hexagons. They can be warped progressively across an area to satisfy requirements of distances between refractoin points. In fact, the triangulation system described is very flexible and is readily adapted to the conditions at hand. It has been found quite accurate in determining surfaces of marker beds occurring at depths from 2,000 to 10,000 feet. The hexagonal geometry is easy to handle both in the field and in computation. The method has given satisfactory results in oil fields prospecting wherein the buried strata slope 10 per cent or less, with occasional slopes of much greater magnitude, including faults.

While the source of waves has been described for the sake of simplicity as being at the surface of the earth, it will be understood that it is ordinarily placed from 100 to 300 feet below the surface in accordance with known practice. The same considerations apply and the same results are secured.

Seismic wave trajectories are reversible. Hence in all cases the shot point and detector positions can be interchanged without affecting the results.

In all embodiments using a plurality of refraction lines angularly disposed, one detector is sufficient for the present purposes. However, more than one detector can be employed as indicated in Figs. 7 and 9 wherever it is desired to secure the additional information that such procedure is instrumental in securing.

What I claim is:—

1. A method for determining sub-surface geological structure in regions in which there is at least one buried stratum of known relatively high characteristic speed, which method comprises setting up a source of seismic waves adjacent the surface of the earth so as to cause waves to penetrate downwardly to the high speed stratum, to intercept the stratum at a first refraction point corresponding to the critical angle at the interface between the high speed stratum and overlying strata, to follow the top of the high speed stratum and to be refracted upwards at the critical angle, detecting such refracted waves at a position on the earth, said position having associated therewith a second refraction point on the high speed stratum corresponding to the critical angle, then setting up another source of waves at a location on the surface of the earth different from the first and lying on the circumference of a circle the center of which is at an offset position point on the earth directly above the first refraction point and the radius of which is equal to the offset distance between the first source and said offset position point, so that waves are again caused to penetrate downwardly, to intercept the high speed stratum at substantially the same first refraction point, to follow the top of the high speed stratum and to leave upwardly at the critical angle, and detecting waves at a position spaced from said second source and lying in a vertical plane including it and the said common first refraction point, said position having associated therewith another second refraction point, whereby the differential depth between the two second refraction points can be calculated and inferences drawn as to the contour of the high-speed stratum.

2. A method for determining sub-surface geological structure in regions in which there is at least one buried stratum of known relatively high speed, which comprises setting up a source of seismic waves adjacent the surface of the earth so as to cause waves to penetrate downwardly to the high speed stratum, to intercept the stratum at a first refraction point corresponding to the critical angle at the interface between the high speed stratum and overlying strata, to follow the interface and to be refracted upwards at the critical angle, detecting such refracted waves at a position on the earth, said position having associated therewith a second refraction point on the high speed stratum corresponding to the critical angle, setting up another source of waves at a location on the surface of the earth different from the first and lying on the circumference of a circle the center of which is at an offset position point on the earth directly above the first refraction point and the radius of which is equal to offset distance between the first source and said offset position point, so that waves are again caused to penetrate downwardly to intercept the high speed stratum at substantially the same first refraction point, to follow the interface and to leave upwardly at the critical angle, detecting waves at a position spaced from said second source and lying in vertical plane including it and the said common first refraction point, said position having associated therewith another second refraction point, and setting up a third source of waves similarly offset with respect to one of the second refraction points and alined with the two second refraction points, and detecting waves at a point similarly offset with respect to the other of the said second refraction points and alined with said two second refraction points and the third source, the two second refraction points lying between the source and the point of detection, whereby the absolute depths of the three refraction points can be found.

3. A method of determining sub-surface geological structure in regions in which there is at least one buried stratum of known relatively high characteristic speed, which method comprises setting up a source of seismic waves adjacent the surface of the earth so as to cause waves to penetrate downwardly to the high speed stratum, to intercept the stratum at a first refraction point corresponding to the critical angle at the interface between the high speed stratum and overlying strata, to follow the top of the high speed stratum and to be refracted upwards at the critical angle, detecting such refracted waves at at least one position on the earth, said position having associated therewith a second refraction point on the high speed stratum corresponding to the critical angle, then setting up another source of waves at a location on the surface of the earth different from the first and lying angularly displaced therefrom on the circumference of a circle, the center of which is at an offset position point on the earth directly above the first refraction point and the radius of which is equal to the offset distance between the first source and said offset position point so that waves are again caused to penetrate downwardly, to intercept the high speed stratum at substantially the same first refraction point, to follow the interface and to leave upwardly at the critical angle, and detecting waves at at least one position spaced from said second source and lying in a vertical plane including it and the said common first refraction point, said position having associated therewith another second refraction point, and continuing the procedure described over a plurality of angles whereby the differential depth between the several second refraction points can be calculated and the contour of the high speed stratum determined.

4. The method of claim 3 wherein at each angular position waves are detected at a plurality of alined spaced points, so as to determine differential depths between the several second refraction points.

5. A method for determining sub-surface geological structure in regions in which there is at least one buried stratum of known relatively high characteristic speed, which method comprises setting up a source of seismic waves adjacent the surface of the earth so as to cause waves to penetrate downwardly to the high speed stratum, to intercept the stratum at a first refraction point corresponding to the critical angle at the interface between the high speed stratum and overlying strata, to follow the top of the high speed stratum and to be refracted upwards at the critical angle; detecting such refracted waves at a position on the earth, said position having associated therewith a second refraction point on the high speed stratum corresponding to the critical angle; then setting up another source of waves at a location on the surface of the earth different from the first and lying angularly spaced therefrom on the circumference of a circle the center of which is at an offset position point on the earth directly above the first refraction point and the radius of which is equal to the offset distance between the position of the first source of waves and said offset position point, so that waves are again caused to penetrate downwardly to intercept the high speed stratum at substantially the same first refraction point, to follow the interface and to leave upwardly at the critical angle; and detecting waves at a position spaced from said second source and lying in a vertical plane including it and the said common first refraction point, said position having associated therewith another second refraction point; repeating the process throughout a circle, to form a group of refraction lines; then setting up another source at a location spaced from that of the first group of sources and so disposed that the second refraction point associated with said other source substantially coincides with that of one of the second refraction points associated with said first group of refraction lines; then setting up a plurality of sources with associated detectors forming a second group of refraction lines having common first refraction points with the refraction point associated with said other source; whereby relative depths of all the second refraction points can be determined.

6. A method for determining sub-surface geological structure in regions in which there is at least one buried stratum of known relatively high characteristic speed, which method comprises setting up a source of seismic waves adjacent the surface of the earth so as to cause waves to penetrate downwardly to the high speed stratum, to intercept the stratum at a first refraction point corresponding to the critical angle at the interface between the high speed stratum and overlying strata, to follow the top of the high-speed stratum and to be refracted upwards at the critical angle; detecting such refracted waves at a position on the earth, said position having associated therewith a second refraction point on the high speed stratum corresponding to the critical angle; then setting up another source of waves at a location on the surface of the earth different from the first and lying angularly spaced therefrom by an angle of about 60 degrees on the circumference of a circle the center of which is at an offset position point on the earth directly above the first refraction point and the radius of which is equal to the offset distance between the position of the first source of waves and said offset position point, so that waves are again caused to penetrate downwardly to intercept the high speed stratum at substantially the same first refraction point, to follow the interface and to leave upwardly at the critical angle; and detecting waves at a position spaced from said second source and lying in a vertical plane including it and the said common first refraction point, said position having associated therewith another second refraction point; repeating the process at approximately 60 degree angles throughout a circle to form a set of six refraction lines, six sources being set up in all; and then setting up a seventh source at a position such that one refraction point associated with the seventh source substantially coincides with one of said second refraction points and another refraction point associated with the seventh source substantially coincides with another of said second refraction points; and detecting waves similarly, whereby depths of the six second refraction points can be determined.

7. A method for determining sub-surface geological structure in regions in which there is at least one buried stratum of known relatively high characteristic speed, which method comprises setting up a source of seismic waves adjacent the surface of the earth so as to cause waves to penetrate downwardly to the high speed stratum, to intercept the stratum at a first refraction point corresponding to the critical angle at the interface between the high speed stratum and overlying strata, to follow the top of the high speed stratum and to be refracted upwards at the critical angle, detecting such refracted waves at a position on the earth, said position having associated therewith a second refraction point on the high speed stratum corresponding to the critical angle, then setting up a second source of waves, at a location different from the first and so spaced with respect to the first source, that one of the two refraction points associated with the second source substantially coincides with one of the two refraction points associated with the first source, and detecting waves from said second source, whereby the differential depth between the refraction points which are not coincident can be calculated and inferences drawn as to the contour of the high-speed stratum.

8. A method for determining sub-surface structure in regions having at least one buried stratum of known relatively high characteristic speed, which method comprises setting up a source of seismic waves adjacent the surface of the earth, to cause waves to impinge on the said high-speed stratum and follow along said stratum, detecting waves at a position on the earth spaced from the source such distance that the first subterranean waves reaching the detecting position are those which pass along the said high-speed stratum, setting up another source of waves spaced from the first at a position so located that waves from it will impinge on the high-speed stratum and pass along it, said impinging waves having one common point of impingement with the waves from the first source, and again detecting waves at another position on the earth such that the first subterranean waves reaching it are those which pass along said high-speed stratum from the second source; whereby inferences can be drawn as to the contour of the high-speed stratum.

9. A method of determining the contour of a subterranean bed of known relatively high characteristic speed, which comprises setting up a source of seismic waves in the earth and detecting waves at a position spaced from the source such distance that the first subterranean waves reaching it are those which have coursed along the high speed bed, and setting up a second source and detecting waves at a second position so spaced that the first subterranean waves reaching it are those which have coursed along the high speed bed; there being, for each of said source and detecting-position arrangements, two offset positions located on a line joining the source and detecting position and calculated to lie directly over two refraction points on the high speed bed where waves from the source enter and course along the high speed bed, and leave the high speed bed and go to the detecting position, respectively; the second source and detecting position being so arranged that one of the two offset positions associated therewith, coincides with one of the offset positions corresponding to the first source and detecting position; whereby the relative depths of the marker bed below the two offset positions which are not coincident may be calculated.

10. The method of claim 9 wherein the second source and detecting position are so arranged with respect to the first source and detecting position that the first offset positions, viz. those lying over the first-named refraction points where waves from the source enter the high speed bed, are coincident.

11. A method of determining the contour of a subterranean bed of known relatively high characteristic speed, which comprises carrying out the operations set forth in claim 9, and setting up a third source and detecting waves at a third detecting position so spaced that the first subterranean waves reaching it are those which have coursed along the high speed bed, said third source and detecting position having associated therewith two offset positions, and being so arranged with respect to the first and second sources and detecting positions, that said two offset positions for the third source and detector position, coincide respectively with those two offset positions of the first and second sources and detecting positions, which are not common; whereby the depth of the high speed bed beneath the three coincident offset positions can be calculated.

12. A method of determining the contour of a subterranean bed of known relatively high characteristic speed which comprises setting up a source of seismic waves in the earth over said high speed bed and detecting waves at a position in the earth so spaced from the source as to receive waves therefrom by a trapezoidal trajectory, which trajectory includes the high speed bed, setting up a second source of waves over said high speed bed and detecting waves at a second position so spaced from the second source as to receive waves therefrom by a trapezoidal trajectory, which trajectory includes the high speed bed, said second source and second detector being so disposed with respect to said first source and first detector that one of two offset positions between the first source and its detector substantially coincides with one of the two offset positions between the second source and its detector.

LOUIS W. GARDNER.